(12) United States Patent
Tompkin et al.

(10) Patent No.: US 7,907,339 B2
(45) Date of Patent: Mar. 15, 2011

(54) METALLISED SECURITY ELEMENT

(75) Inventors: Wayne Robert Tompkin, Baden (CH); Andreas Schilling, Hagendorn (CH)

(73) Assignee: OVD Kinegram AG, Zug (CH)

( * ) Notice: Subject to any disclaimer, the term of this patent is extended or adjusted under 35 U.S.C. 154(b) by 755 days.

(21) Appl. No.: 11/661,487

(22) PCT Filed: Aug. 29, 2005

(86) PCT No.: PCT/EP2005/009287
§ 371 (c)(1), (2), (4) Date: May 17, 2007

(87) PCT Pub. No.: WO2006/024478
PCT Pub. Date: Mar. 9, 2006

(65) Prior Publication Data
US 2008/0094713 A1    Apr. 24, 2008

(30) Foreign Application Priority Data

Aug. 30, 2004 (DE) .......... 10 2004 042 136

(51) Int. Cl.
*G02B 5/18* (2006.01)

(52) U.S. Cl. .............. 359/569; 359/576; 359/2

(58) Field of Classification Search ........... 359/566, 359/569, 576, 2
See application file for complete search history.

(56) References Cited

U.S. PATENT DOCUMENTS

| | | | |
|---|---|---|---|
| 4,856,857 A | 8/1989 | Takeuchi et al. | |
| 4,882,477 A | 11/1989 | Oogita et al. | |
| 5,298,922 A | 3/1994 | Merkle et al. | |
| 6,284,396 B1 | 9/2001 | Kaule et al. | |
| 6,909,547 B2 * | 6/2005 | Weiteneder et al. | 359/569 |
| 6,924,934 B2 | 8/2005 | Schilling et al. | |
| 7,145,723 B2 | 12/2006 | Tompkin et al. | |
| 2002/0117846 A1* | 8/2002 | Kaule et al. | 283/72 |
| 2004/0239099 A1* | 12/2004 | Tompkin et al. | 283/74 |
| 2007/0183045 A1 | 8/2007 | Schilling et al. | |

FOREIGN PATENT DOCUMENTS

| | | |
|---|---|---|
| DE | 4130 896 | 7/1992 |
| DE | 10150293 | 4/2003 |
| DE | 10351129 | 6/2005 |
| DE | 102004016596 | 10/2005 |

(Continued)

OTHER PUBLICATIONS

Computer Translation of EP 0 758 587, Apr. 1, 1996.* "Deutsches Worterbuch", G. Wahrig, Bertelsmann GmbH, 1986/1991, p. 1290, ISBN 3-570-03648-0.

*Primary Examiner* — Joshua L Pritchett
(74) *Attorney, Agent, or Firm* — Hoffmann & Baron, LLP

(57) ABSTRACT

The invention concerns a security element (11) in the form of a multi-layer film body, a security document having such a security element and a process for the production of such a security element. The film body on a carrier film (10) has a release layer (20), a protective lacquer layer (21), a replication lacquer layer (22) with relief structures (25, 26), a metal layer (23) and an adhesive layer (24). A first relief structure (25) has a depth-to-width ratio of >0.5, whereby the metal layer (23) is more transparent in the region of the first relief structure (25). A second relief structure (26) has a low depth-to-width ratio whereby the metal layer (23) is less transparent or is opaque in the region of the second relief structure (26).

23 Claims, 13 Drawing Sheets

FOREIGN PATENT DOCUMENTS

| | | |
|---|---|---|
| EP | 0216 947 | 4/1987 |
| EP | 0372 274 | 6/1990 |
| EP | 0758 587 | 2/1997 |
| GB | 2136352 | 9/1984 |
| RU | 2157765 C2 | 10/2000 |
| WO | WO 93/11510 | 6/1993 |
| WO | WO 03/033274 | 4/2003 |
| WO | WO 03/043832 | 5/2003 |
| WO | WO 03/055691 | 7/2003 |

* cited by examiner

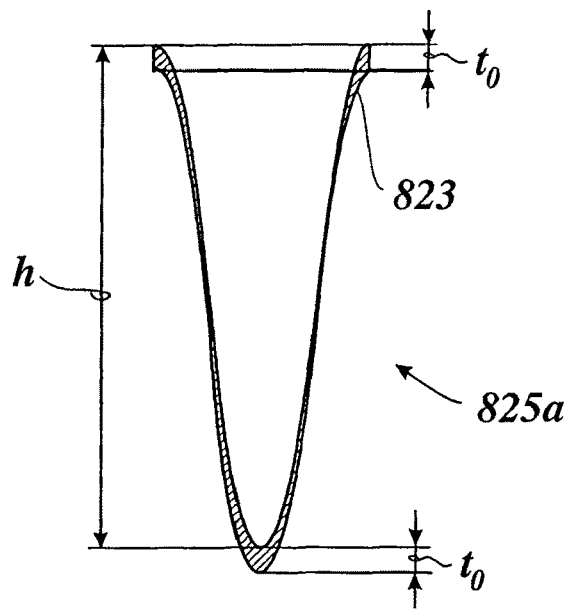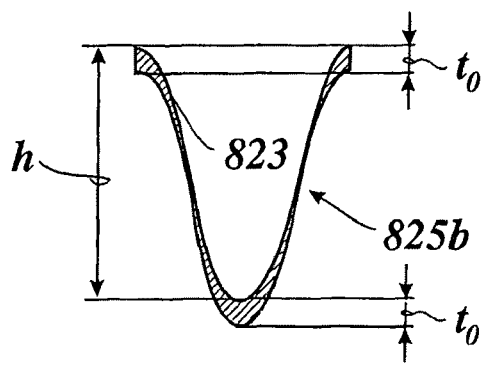
*Fig. 8a*    *Fig. 8b*
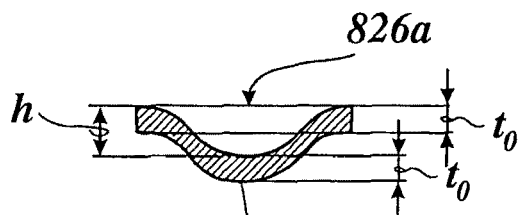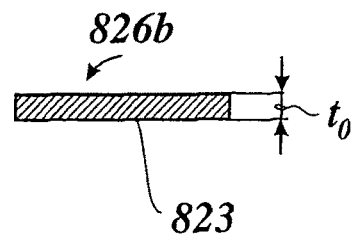
*Fig. 8c*    *Fig. 8d*

METALLISED SECURITY ELEMENT

This application claims priority based on an International Application filed under the Patent Cooperation Treaty, PCT/EP2005/009287, filed on Aug. 29, 2005 and German Application No. 102004042136.6, filed on Aug. 30, 2004.

FIELD OF THE INVENTION

The invention relates to a security element in the form of a multi-layer film body which has a replication lacquer layer and a metal layer arranged thereon, and in which a relief structure is shaped in the replication lacquer layer. The invention further relates to a security document with such a security element and a process for the production for such a security element.

BACKGROUND OF THE INVENTION

Optical security elements are frequently used to make it difficult to copy and misuse documents or products and if possible to prevent such copying and misuse. Thus, optical security elements are frequently used for safeguarding documents, banknotes, credit cards, cash cards and the like. In that respect it is known to use optically variable elements which cannot be duplicated with conventional copying processes. It is also known for security elements to be provided with a structured metal layer which is in the form of a text, logo or other pattern.

The production of a structured metal layer from a metal layer which is applied over a surface area for example by sputtering requires a large number of processes, in particular if fine structures are to be produced, which afford a high level of safeguard against forgery. Thus it is known for example for a metal layer which has been applied over the full surface area to be partially demetallised by positive/negative etching or by laser ablation, and thus structured. As an alternative thereto it is possible for metal layers to be already applied in structured form to a carrier by means of the use of vapour deposition masks.

The greater the number of production steps for producing the security element, the greater the significance involved in register accuracy in respect of the individual process steps.

Thus for example GB 2 136 352 A describes a production process for the production of a sealing film provided with a hologram as the security feature. In that case, a plastic film is metallised over its full surface area after embossing of a diffractive relief structure therein and is then region-wise demetallised in accurate register relationship with the embossed diffractive relief structure.

SUMMARY OF THE INVENTION

Now the object of the invention is to improve the production of an optical security element which has a structured metallic surface layer and to provide an improved optical security element having such a metallic surface layer.

The object of the invention is attained by a security element in the form of a multi-layer film body which has a replication lacquer layer, wherein in a plane defined by co-ordinate axes x and y a first relief structure is shaped into the replication lacquer layer in a first region of the security element and a metal layer of constant surface density with respect to the plane defined by the co-ordinate axes x and y is applied to the replication lacquer layer in the first region of the security element and in an adjacent second region of the security element, wherein the first relief structure is a diffractive structure with a depth-to-width ratio of the individual structure elements of >0.5 and the metal layer is of a nominal layer thickness $t_o$ with which the transparency of the metal layer is increased by the first relief structure in the first region with respect to the transparency of the metal layer in the second region.

The invention is further attained by a process for the production of a security element in the form of a multi-layer film body, wherein a first relief structure is shaped into a replication lacquer layer of the multi-layer film body in a first region of the security element and a metal layer of constant surface density with respect to the plane defined by the replication lacquer layer is applied to the replication lacquer layer in the first region of the security element and in an adjacent second region of the security element, so that the first relief structure is shaped in the form of a diffractive structure with a depth-to-width ratio of the individual structure elements of >0.5 and the metal layer is applied with a surface density with respect to the plane defined by the replication lacquer layer and is produced in a nominal layer thickness $t_o$ in such a way that the transparency of the metal layer is increased by the first relief structure in the first region with respect to the transparency of the metal layer in the second region.

In that respect the transparency in the first region is enhanced visibly in particular for the human eye but there can also be an enhanced transparency which can be detected only by way of machine optical measurement systems.

The invention reduces the cost of the production of security elements in which the metal layer is to be provided not over the entire surface area but only in a pattern region. More specifically the invention provides for uniform deposition of metal over the full surface area involved to form the metal layer on the replication lacquer layer, wherein by virtue of the first relief structure in the first region the metal layer is so thin that it is transparent there or appears to be absent. Procedures which were necessary hitherto for structuring a metal layer applied to the relief structure are eliminated with the process according to the invention. The invention provides that cost-intensive and environmentally damaging process steps, for example printing, etching and stripping processes, are saved in the production of such security elements, and the level of register accuracy is significantly enhanced.

Very high levels of resolution are possible by means of the process according to the invention. The resolution which can be achieved is better by a factor of 1000 than resolutions which can be achieved by other processes. Because the width of the structure elements of the first relief structure can be in the region of the wavelength of visible light but also below that, it is possible to produce metallised pattern regions having very fine contours. Accordingly major advantages over the processes used hitherto are also achieved in this respect and it is possible with the invention to produce security elements with a higher degree of safeguard against copying and forgery than hitherto.

The invention adopts a heuristic approach in markedly increasing the surface area of a structure by resolving it into very fine structure elements and in that region making a metal layer which is applied over the surface so thin that it appears transparent or more transparent. In that case the surface is formed by a large number of structure elements with a high depth-to-width ratio. The term depth-to-width ratio in that respect is used to denote the ratio between a mean height h of two adjacent structure elements or a mean profile depth and a spacing d of two adjacent structure elements or a period spacing. In that case the metal layer is deposited perpendicularly onto the plane defined by the replication lacquer layer in a thickness t, wherein the more the effective thickness of the metal layer on the surface of the replication lacquer layer is reduced, the greater the effective surface area of the region, that is to say the greater the depth-to-width ratio of the relief structure of the region on which the metal is deposited. A thin metal layer of that kind can appear transparent or semitransparent, in which respect that effect can be heuristically explained.

The effective surface area in a region R whose structure depth is determined by the function $z=f(x, y)$ can be described by the following equation:

$$S = \int\int_R \sqrt{1 + f_x^2 + f_y^2}\, dA$$

A cross grating with periods $d_x$ in the x-direction and $d_y$ in the y-direction, wherein x and y are orthogonal axes, and of a profile depth h, can be described for example by the following function:

$$f(x, y) = h\sin^2\left(\frac{\pi x}{d_x}\right)\sin^2\left(\frac{\pi y}{d_y}\right)$$

If the periods x and y are identical, that is to say $d_x=d_y=d$, that affords the following partial differential quotients:

$$f_x = \frac{\partial}{\partial x}h\sin^2\left(\frac{\pi x}{d}\right)\sin^2\left(\frac{\pi y}{d}\right) = \frac{h\pi}{d}\sin\left(\frac{2\pi x}{d}\right)\sin^2\left(\frac{\pi y}{d}\right)$$

$$f_y = \frac{\partial}{\partial y}h\sin^2\left(\frac{\pi x}{d}\right)\sin^2\left(\frac{\pi y}{d}\right) = \frac{h\pi}{d}\sin^2\left(\frac{\pi x}{d}\right)\sin\left(\frac{2\pi y}{d}\right)$$

The effective surface area is thus defined by the following equation:

$$S = \int\int_R \sqrt{1 + f_x^2 + f_y^2}\, dA$$

$$= \int_0^d \int_0^d \sqrt{1 + \left(\frac{h\pi}{d}\right)^2 \left[\begin{array}{c}\left(\sin\left(\frac{2\pi x}{d}\right)\sin^2\left(\frac{\pi y}{d}\right)\right)^2 + \\ \left(\sin^2\left(\frac{\pi x}{d}\right)\sin\left(\frac{2\pi y}{d}\right)\right)^2\end{array}\right]}\, dxdy$$

That equation cannot be analytically resolved in a simple fashion. By numerical resolution of that equation however it was surprisingly established that, in the case of a metal layer which is applied to the cross grating in a nominal thickness $t_0$ and which is formed locally with the thickness t, the thickness ratio $\epsilon=t_0/t$ significantly increases if the depth-to-width ratio h/d of the relief structure of the cross grating is greater than 1. More specifically, the relief structure provides that the thickness t of the metal layer is markedly reduced in relation to the nominal thickness $t_0$ (thickness in "flat" regions). For example with h=2d, that is to say if the profile depth h is double the grating period d, the thickness ratio $\epsilon=3.5$. With a relief structure with a depth-to-width ratio h/d=2 the thickness t of the metal layer is therefore only still 0.3 $t_0$, that is to say in that region the metal layer is only one third as thick as in a flat region.

A line grating of a period d and of a profile depth h can be described by the following equation:

$$f(x, y) = h\sin^2\left(\frac{\pi x}{d}\right)$$

That affords the following partial differential quotients:

$$f_x = \frac{\partial}{\partial x}h\sin^2\left(\frac{\pi x}{d}\right) = \frac{h\pi}{d}\sin\left(\frac{2\pi x}{d}\right)$$

$$f_y = \frac{\partial}{\partial y}h\sin^2\left(\frac{\pi x}{d}\right) = 0$$

The effective surface area can thus be described by the following equation:

$$S = \int\int_R \sqrt{1 + f_x^2 + f_y^2}\, dA$$

$$= \int_0^d \int_0^d \sqrt{1 + \left(\frac{h\pi}{d}\right)^2 \left[\left(\sin\left(\frac{2\pi x}{d}\right)\right)^2\right]}\, dxdy$$

$$= \frac{2d^2}{\pi} E\left(\frac{-h^2\pi^2}{d^2}\right)$$

In that case E ($\alpha$) represents the entire elliptical second-order integral.

In this case also numerical resolutions of that equation have surprisingly revealed that the thickness ratio $\epsilon$ is significantly increased if the depth-to-width ratio h/d>1.

Surprisingly it has been found that, with the same depth-to-width ratio, the increase in the thickness ratio $\epsilon$ with the linear grating is greater than with the above-considered cross grating.

It can therefore be provided that the relief structure is in the form of a cross grating or a linear grating, that is to say the relief structure involves a mathematical function with a period configuration, for example with a sine-quadratic configuration.

It can also be provided however that the relief structure is produced with a stochastic periodic configuration, wherein such a configuration can be produced in the x-direction or in the y-direction or in the x-direction and in the y-direction.

It is also possible for transparency of the metal layer to be achieved by means of relief structures which have a complex surface profile with raised portions or depressions of differing heights. In that respect such surface profiles may also involve stochastic surface profiles. In that case transparency is generally achieved if the mean spacing of adjacent structure elements is less than the mean profile depth of the relief structure and adjacent structure elements are spaced less 200 µm from each other. Preferably in that respect the mean spacing of adjacent raised portions is selected to be less than 30 µm so that the relief structure is a special diffractive relief structure.

Advantageous configurations of the invention are recited in the appendant claims.

Advantageously the nominal thickness $t_0$ of the metal layer is such that on the one hand sufficient transparency of the metal layer is certain to occur in the regions with a high depth-to-width ratio and on the other hand the metal layer characterised by its nominal thickness $t_0$ appears opaque or predominantly opaque. An observer typically already perceives a region as being opaque or as being fully reflecting if 85% of the incident light is reflected and an observer already perceives a region as being transparent if less than 20% of the incident light is reflected and more than 60% is transmitted. Those values can vary in dependence on the substrate, the lighting and so forth. In that respect an important part is played by the absorption of the light in the metal layer. For example under certain circumstances chromium reflects much less.

In that respect the thickness t which is produced on a structure element is to be interpreted as a mean value for the thickness t is formed in dependence on the angle of inclination of the surface of the relief structure with respect to the horizontal. That angle of inclination can be mathematically described by the first derivative of the function of the relief structure.

If the local angle of inclination of the relief structure is equal to zero, that is to say if the relief structure is in the form of a planar region, the direction in which it extends being perpendicular to the direction of application of the metal layer, the metal layer is deposited with the nominal thickness $t_0$. If the magnitude of the local angle of inclination of the relief structure is greater than zero the metal layer is deposited with the thickness t which is less than the nominal thickness $t_0$.

In the production of transparent regions, it is important to know the individual parameters in respect of their dependencies and to appropriately select them. In particular precise calculations of the diffractive behaviour of the structures which should include dispersion serve for that purpose.

It can preferably be provided that the metal layer is applied to the replication lacquer layer with such a surface density which corresponds to an application of the metal layer to a flat surface with a depth-to-width ratio equal to zero with a degree of reflection of the metal layer of 85% to 95% of the maximum attainable degree of reflection. In that respect the maximum attainable degree of reflection is dependent on the nature of the metal. Metal layers of silver and gold have a very high maximum degree of reflection but copper is also highly suitable.

As has been found, in particular the degree of transparency of the metal layer, apart from the depth-to-width ratio of the relief structure, is dependent on the polarisation of the incident light. It can be provided that that effect is used for secondary security features.

It was further found that the degree of transparency and/or the degree of reflection of the metal layer is wavelength-dependent. Thus, colour effects can be observed upon irradiation with polychromatic light, for example with daylight. It can be provided that those colour effects are used as an additional second security feature.

It can be provided that a second diffractive relief structure is shaped into the second region of the replication lacquer layer, the second relief structure being formed with a depth-to-width ratio<0.2 and in that way being substantially non-transparent.

It can also be provided that the second relief structure has a depth-to-width ratio of <1. In that way it can be provided that the first and second relief structures form an optically cohesive region in which a degree of transparency of between 0 and 100% can be produced. Such a region can be provided for example in order to produce a so-called fading-in effect for structures arranged under that region. In that way for example a passport photograph of a security document can be produced with a contourless edge. Such an effect can be an additional security feature.

It can be provided that the first region forms a transparent pattern region which in the form of a logo or a text and with a high depth-to-width ratio, in which a background region disposed under that region is visible. It can however also be provided that the second region forms a pattern region which is in the form of a logo or a text, with a low depth-to-width ratio, so that the region is non-transparent or metallically shiny against the background region.

It is further possible for the second region to extend in the form of a fine line pattern, for example a guilloche pattern. The particular advantage of using the present invention in that respect is that this fine line pattern can be particularly filigree and can be disposed in register relationship with all diffractive security features. For example a relief structure with a high depth-to-width ratio is provided in the first region and a relief structure with a low depth-to-width ratio is provided in the second region, forming the filigree lines of the guilloche pattern.

The use of the invention makes it possible for the depth-to-width ratio of the first relief structure and/or the second relief structure to be discretely or continuously varied in the x-direction and/or in the y-direction.

It can advantageously be provided that raster elements involving differing transparency or differing opacity can be produced in that way. Any image representations can be produced by means of such raster elements, the dimensions of which are advantageously smaller than can be resolved by the human eye.

It can be provided that only two kinds of raster elements are produced, namely transparent raster elements and opaque raster elements. Monochrome images in the nature of a line image can be produced in that way.

It can also be provided however that pixels are produced with raster elements, whose grey value is determined by the surface area ratio between transparent and opaque raster elements. Black-and-white images can be produced from the pixels in that way.

It can also be provided that raster elements which are stepped in grey scales are produced, by the depth-to-width ratio of the relief structure determining the grey value of the raster element. In that way it is possible for example to produce monochrome computer grey scale images with 8-bit resolution.

The particular advantages of producing such images in accordance with the process of the invention are that it is possible to produce particularly fine rastering which satisfies high demands and that the image can be in register relationship with all diffractive security features. In that respect the raster spacing can be below the level of resolution of the human eye. In that case the dimension of the individual raster regions is preferably less than 300 µm, preferably about 50 µm.

It can also be provided that the first and/or the second relief structure is formed from a superpositioning of an envelope structure and a diffractive structure with a high depth-to-width ratio. It can be provided in that respect that the envelope structure is a structure which has an optical-diffraction effect, in particular a relief structure generating a hologram. It can also be provided however that the envelope structure is a macrostructure or a matte structure. A high level of register accuracy is achieved in that way without involving additional technological complication and expenditure for the regions covered by the first and/or second relief structures are formed by a resulting common relief structure. Procedures which were necessary hitherto for structuring a metal layer applied to the relief structure are eliminated with the process according to the invention.

Advantageously the multi-layer film body of the security element according to the invention can be in the form of a transfer film, in particular a hot stamping film. In that way a security document, in particular a banknote or a passport, can be provided with the security element according to the invention in known fashion, that is to say with the existing machines and apparatuses.

It is advantageously provided that the metal layer is applied by sputtering to the replication lacquer layer of the security element according to the invention. In that way it is possible to use a tried-and-tested process for production of the metal layer. It is preferably provided that a metal for forming the metal layer is deposited on the plane defined by the replication lacquer layer in such a surface density which corresponds to an application of the metal layer on a flat surface arranged perpendicularly to the deposition direction, with a depth-to-width ratio equal to zero and with a degree of reflection of the metal layer of 85% to 95% of the maximum degree of reflection of an optically non-transparent metal layer of the metal. In that respect it can be provided that the metal layer is formed only from a single metal or however from a metal alloy.

It can advantageously be provided that the relief structures are formed in the replication lacquer layer by means of UV replication. Relief structures with a high depth-to-width ratio can be particularly easily and inexpensively produced in that fashion.

A security feature produced with the process according to the invention can be imitated only with very great difficulty with conventional processes, on a replication layer provided with a diffractive structure, as application of a metal layer in accurate register relationship or removal thereof makes very high technological demands.

These variants or a combination of these variants makes it possible to implement complex and optically attractive security elements based on the fundamental idea of the invention.

BRIEF DESCRIPTION OF THE DRAWINGS

The invention is described by way of example hereinafter by means of a number of embodiments with reference to the accompanying drawings in which:

FIGS. 8a to 8d show diagrammatic sectional views of a relief structure according to the invention with differing depth-to-width ratio.

DETAILED DESCRIPTION OF THE INVENTION

Figure 1:
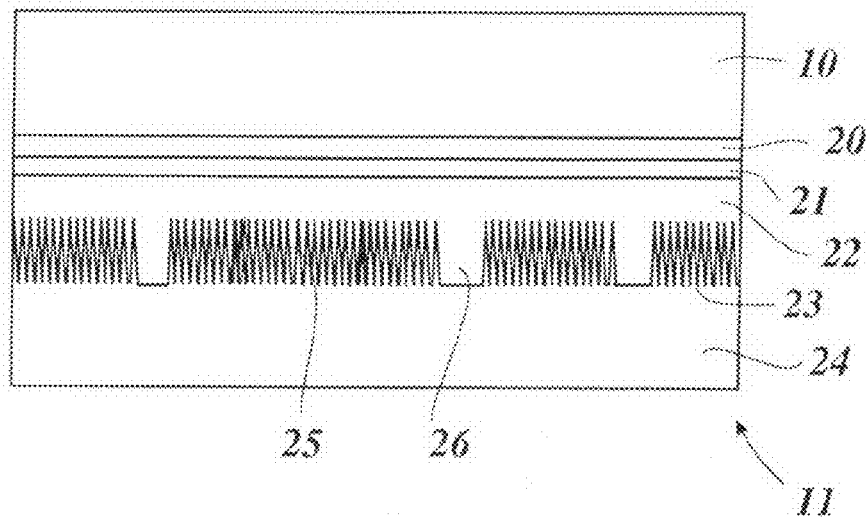
FIG. 1 shows a diagrammatic view of a security element according to the invention.

FIG. 1 shows a security element 11 in the form of a multi-layer film body which has a carrier film 10, a release layer 20, a protective lacquer layer 21, a replication lacquer layer 22 with relief structures 25 and 26, an outer metal layer 23 arranged on the relief structures 25 and 26 and an adhesive layer 24. The relief structure 26 is in the form of a planar relief structure.

The security element 11 is a stamping film, in particular a hot stamping film. It is however also possible for the security element 11 to be in the form of a laminating film or a sticker film.

The carrier layer 10 comprises for example a PET or POPP film of a layer thickness of 10 μm to 50 μm, preferably a thickness of 19 μm to 23 μm. The release layer 20 and the protective lacquer layer 21 are then applied to the carrier film by means of an intaglio printing screen roller. In that respect the release and protective lacquer layers 20 and 21 are preferably of a thickness of 0.2 to 1.2 μm. It would also be possible to dispense with those layers.

The replication lacquer layer 22 is then applied.

The replication lacquer layer 22 preferably comprises a radiation-crosslinkable replication lacquer. Preferably a UV replication process is used for shaping the relief structures 25 and 26 in the replication lacquer layer 22. In that situation a UV-hardenable lacquer is used as the replication lacquer. In that procedure the relief structures 25 and 26 are produced in the UV crosslinkable replication lacquer layer for example by UV irradiation when shaping the relief structure into the lacquer layer while it is still soft or fluid or by partial irradiation and hardening of the UV crosslinkable lacquer layer. In that respect instead of a UV crosslinkable lacquer it is also possible to use another radiation crosslinkable lacquer.

In addition it is also possible for the replication lacquer layer 22 to comprise a transparent, thermoplastic material. A relief structure or a plurality of relief structures, for example the relief structures 25 and 26, is or are then embossed into the replication lacquer layer 22 by means of an embossing tool.

The thickness which is to be selected for the replication lacquer layer 22 is determined by the profile depth selected for the relief structures 25 and 26. It is necessary to ensure that the replication lacquer layer 22 is of a sufficient thickness to permit shaping of the relief structures 25 and 26. Preferably in that respect the replication lacquer layer 22 is of a thickness of 0.3 to 1.2 μm.

By way of example the replication lacquer layer 22 is applied to the protective lacquer layer 21 by means of a line raster intaglio printing roller over the full surface area involved with an application weight of 2.2 g/m$^2$ prior to drying. In that case a lacquer of the following composition is selected as the replication lacquer:

| Component | Proportion by weight |
| --- | --- |
| High-molecular PMMA resin | 2000 |
| Silicone alkyd oil-free | 300 |
| Non-ionic wetting agent | 50 |
| Low-viscosity nitrocellulose | 12000 |
| Toluene | 2000 |
| Diacetone alcohol | 2500 |

The replication lacquer layer 22 is then dried in a drying passage at a temperature of 100 to 120° C.

The relief structures 25 and 26 are then stamped into the replication lacquer layer 22 for example by means of a die comprising nickel, at about 130° C. For stamping the relief structures 25 and 26 into the replication lacquer layer the die is preferably electrically heated. Before the die is lifted off the replication lacquer layer 22 after the stamping operation the die can in that case be cooled down again. After the relief structures 25 and 26 have been stamped into the replication lacquer layer the replication lacquer of the replication lacquer layer 22 hardens by crosslinking or in some other fashion.

It is further also possible for the relief structures 25 and 26 to be introduced into the replication lacquer layer 22 by an ablation process. In particular a laser removal process is suitable for that purpose.

It can also be provided that the replication lacquer layer 22 is coated with an HRI material (HRI=high reflection index), for example with ZnS or $TiO_2$. In that way a greater transparency can be formed in some cases, with a given depth of the relief structure.

In that respect the relief structures 25 and 26 involve relief structures which are coated with the metal layer 23 in a common coating process, for example sputtering, so that the surface density of the metal layer 23 on the relief structures 25 and 26 is constant. In that way the metal layer 23 on the relief structure 26 which has a low depth-to-width ratio is opaque and the metal layer 23 on the relief structure 25 which has a high depth-to-width ratio is transparent. By way of example the relief structure 26 is formed with the depth-to-width ratio h/d=0.

The adhesive layer 24 is then applied to the metal layer 23. The adhesive layer 24 is preferably a layer comprising a thermally activatable adhesive. Depending on the respective use of the security element 11 however it is also possible to dispense with the adhesive layer 24.

The relief structure 25 is a structure with a high depth-to-width ratio in respect of the structure elements of the relief structure and thus that relief structure has an effective surface area which is a multiple greater than conventional relief structures which are shaped in security elements for producing optical effects. In that respect the depth is to be interpreted as the mean spacing between the peaks and troughs and the width is to be interpreted as the spacing of two adjacent structure elements of the relief structure. It was surprisingly found that, in the case of a metal layer which is applied to the relief structure in a nominal thickness $t_0$ and which is formed locally with the thickness t, the thickness ratio $\epsilon = t_0/t$ significantly increases if the depth-to-width ratio h/d of the relief structure is greater than 1. More specifically the thickness t of the metal layer is markedly reduced by the relief structure, in relation to the nominal thickness $t_0$ (thickness in "flat" regions). The metal layer can be transparent in that way.

Figure 2:
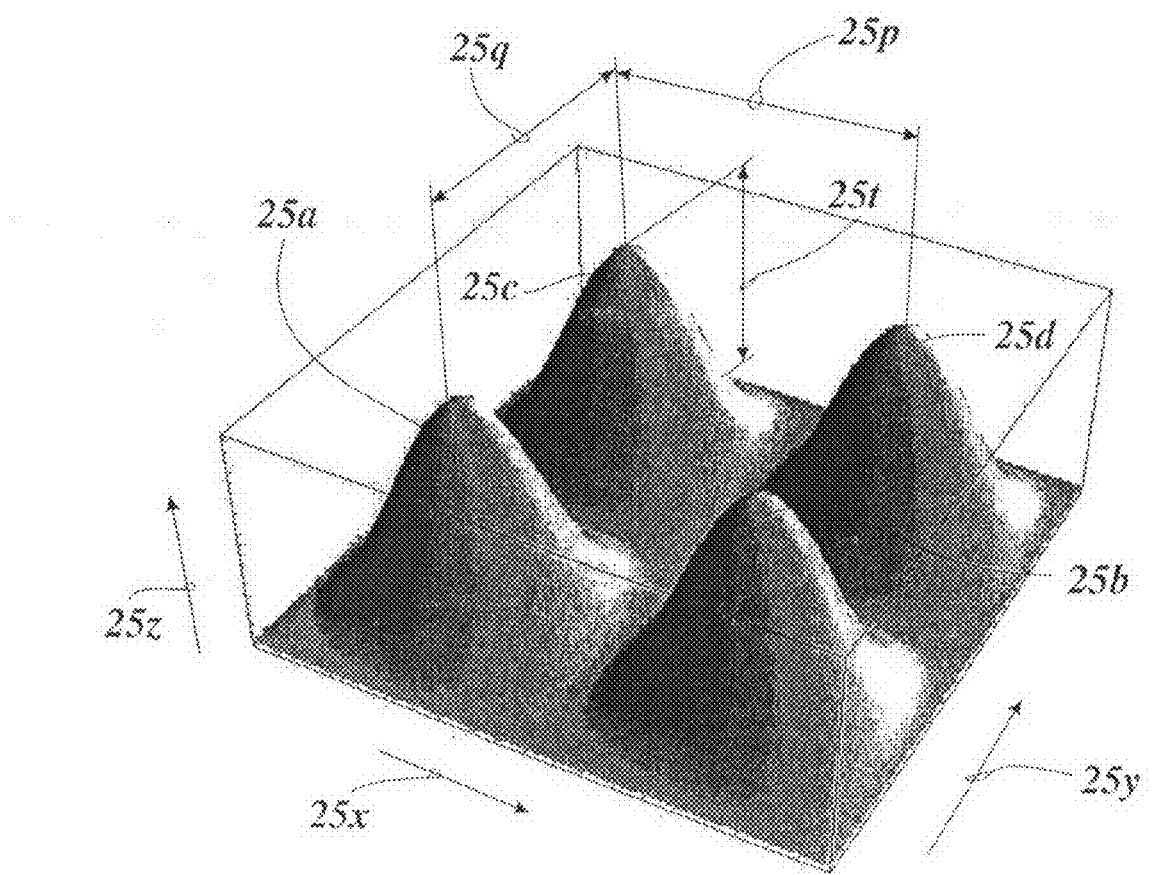
FIG. 2 shows a diagrammatic perspective view of a relief structure of a cross grating.

FIG. 2 now shows a diagrammatic view on an enlarged scale of an embodiment of the relief structure 25 shown in FIG. 1, which is adapted to provide transparency in respect of the metal layer 23 disposed on the relief structure.

As shown in FIG. 2 in this example the relief structure 25 is a periodic function $f(x, y)$, wherein the arrows 25x and 25y represent the identified co-ordinate axes x and y. The function $f(x, y)$ periodically varies the depth 25z of the relief structure 25, in the illustrated case in sine-quadratic form, both in the x- and also in the y-direction. That affords the relief profile shown in FIG. 2 with structure elements 25a, 25b, 25c and 25d which are respectively spaced from each other in the x-direction by a period length 25p and in the y-direction by a period length 25q of the function $f(x, y)$ and are of a structure depth 25t. In this case the period lengths 25p and 25q are so selected that they are less than or equal to the structure depth 25t.

The relief structure 25 shown in FIG. 2 thus involves for example period lengths 25p and 25q of 330 nm and a structure depth 25t of more than 500 nm.

It is also possible in that respect for both the profile shape, the period lengths 25p and 25q and the profile depth 25t to be different from the view shown in FIG. 2. What is essential in that respect is that at least one of the period lengths 25p and 25q is less than or equal to the structure depth 25t. Particularly good results are achieved if at least one of the period lengths 25p and 25q is less than the limit wavelength of visible light.

Figure 3:
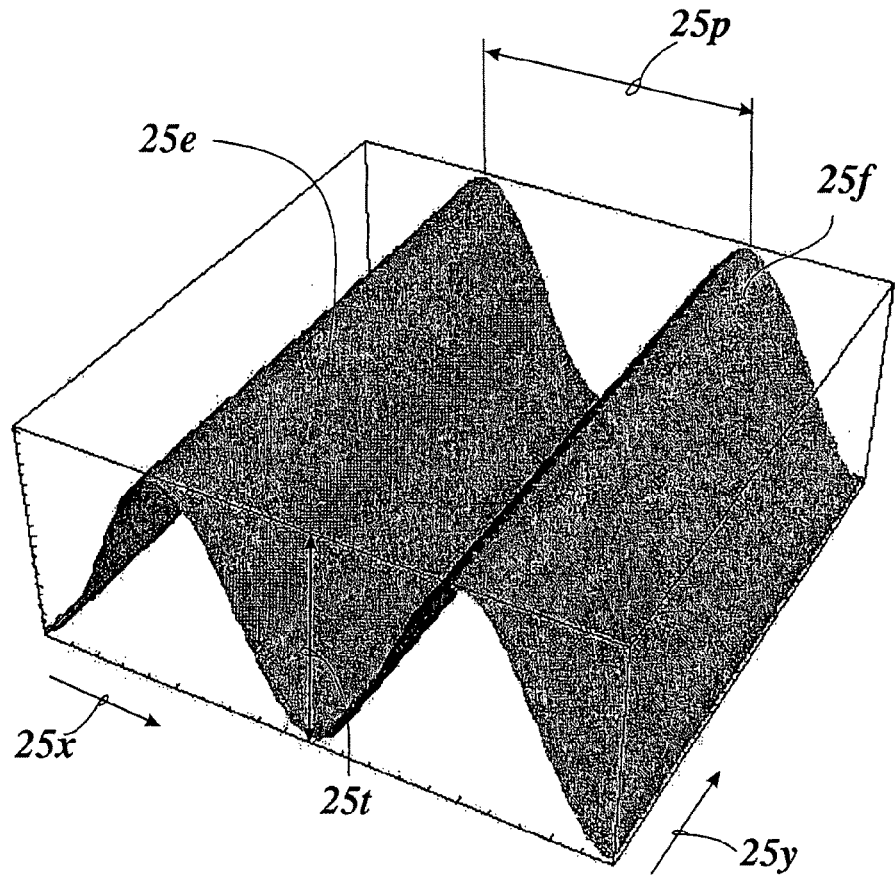
FIG. 3 shows a diagrammatic perspective view of a relief structure of a linear grating.

FIG. 3 shows a relief structure which has structure elements 25e and 25f only in one co-ordinate direction. The other references are as selected in FIG. 2 so that reference will only be made to the differences in relation to the embodiment of FIG. 2. The structure elements 25e and 25f extend with a constant structure depth 25t in the direction of the y-co-ordinate 25y. The relief structure diagrammatically shown in FIG. 3 also appears transparent.

Figure 4:
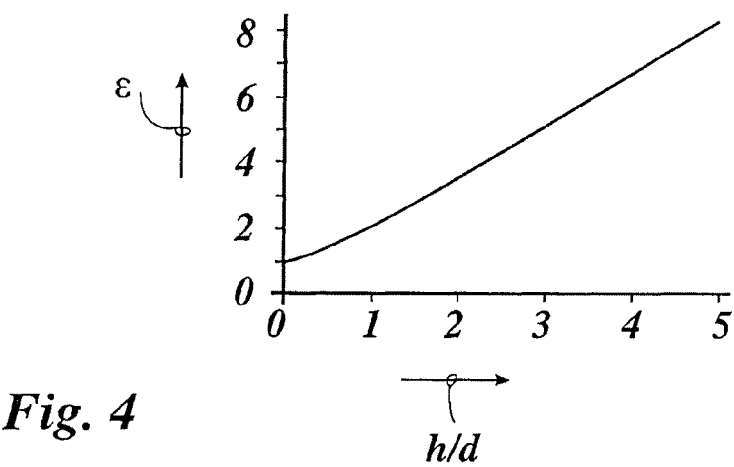
FIG. 4 shows a graph representation of the relationship between the depth-to-width ratio h/d and the thickness ratio ϵ for the relief structure of FIG. 2.
Figure 5:
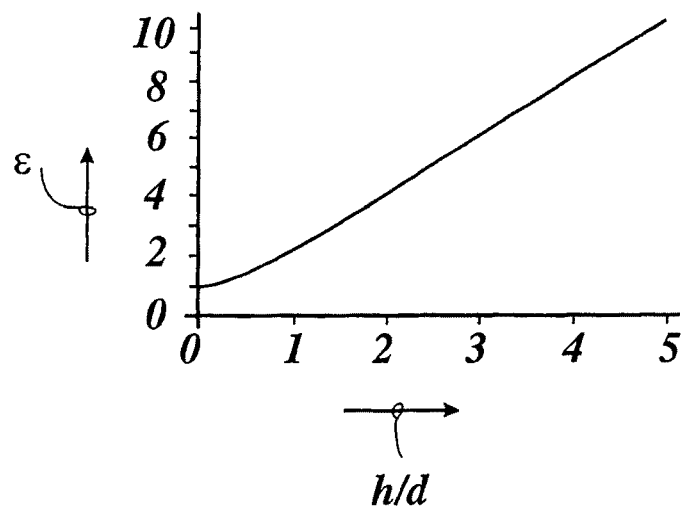
FIG. 5 shows a graph representation of the relationship between the depth-to-width ratio h/d and the thickness ratio ϵ for the relief structure of FIG. 3.

FIGS. 4 and 5 now show in relation to the relief structures illustrated in FIGS. 2 and 3, the relationship between the thickness ratio $\epsilon = t_0/t$ of the metal layer 23 and the depth-to-width ratio h/d of the relief structure 25.

Surprisingly it has been found here that the increase in the thickness ratio $\epsilon$ is greater with the linear grating (see FIG. 3)

than with the previously considered cross grating (see FIG. 2), with the same depth-to-width ratio.

By way of example, with the same depth-to-width ratio h/d=2 for the linear grating the thickness ratio ϵ=4.2, which is greater than the thickness ratio for the above-considered cross grating.

Figure 6:
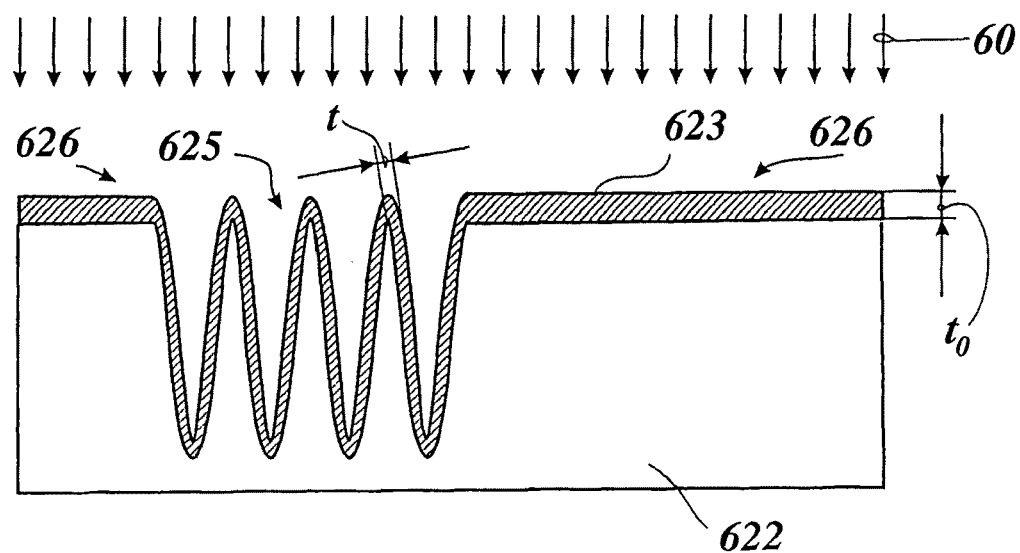
FIG. 6 shows a diagrammatic sectional view of a relief structure according to the invention.

FIG. 6 now shows in detail the thickness change effect in respect of the metal layer 23, which is responsible for affording transparency.

FIG. 6 is a diagrammatic sectional view of a replication lacquer layer 622 with a relief structure 625 with a high depth-to-width ratio and with a relief structure 626 with a depth-to-width ratio equal to zero. Arranged on the replication lacquer layer 622 is a metal layer 623, applied for example by sputtering. Arrows 60 identify the direction of application of the metal layer 623. The metal layer 623 is of the nominal thickness $t_0$ in the region of the relief structure 626 and of the thickness t which is less than the nominal thickness $t_0$ in the region of the relief structure 625. In that respect thickness t is to be interpreted as a mean value for the thickness t is formed in dependence on the angle of inclination of the surface of the relief structure with respect to the horizontal. That angle of inclination can be described mathematically by the first derivative of the function of the relief structure.

If therefore the angle of inclination is equal to zero the metal layer 623 is deposited with the nominal thickness $t_0$, if the value of the angle of inclination is greater than zero the metal layer 623 is deposited with the thickness t, that is to say with a lesser thickness than the nominal thickness $t_0$.

It is also possible for the transparency of the metal layer to be achieved by relief structures which have a complex surface profile with raised portions and depressions of differing height. In that case such surface profiles may also involve stochastic surface profiles. In that case transparency is generally achieved if the mean spacing of adjacent structure elements is less than the mean profile depth of the relief structure and adjacent structure elements are spaced from each other at less than 200 μm. Preferably in that respect the mean spacing of adjacent raised portions is less than 30 μm so that the relief structure is a special diffractive relief structure.

It is important in terms of producing transparent regions for the individual parameters to be known in respect of their dependencies, and appropriately selected. An observer already perceives a region as being fully reflecting if 85% of the incident light is reflected and perceives a region as being transparent if less than 20% of the incident light is reflected and more than 80% is transmitted. Those values can vary in dependence on the substrate, lighting and so forth. An important part is played in that respect by the absorption of light in the metal layer. By way of example chromium and copper reflect much less under some circumstances. That can mean that only 50% of the incident light is reflected, with the degree of transparency being less than 1%.

Figure 7A:
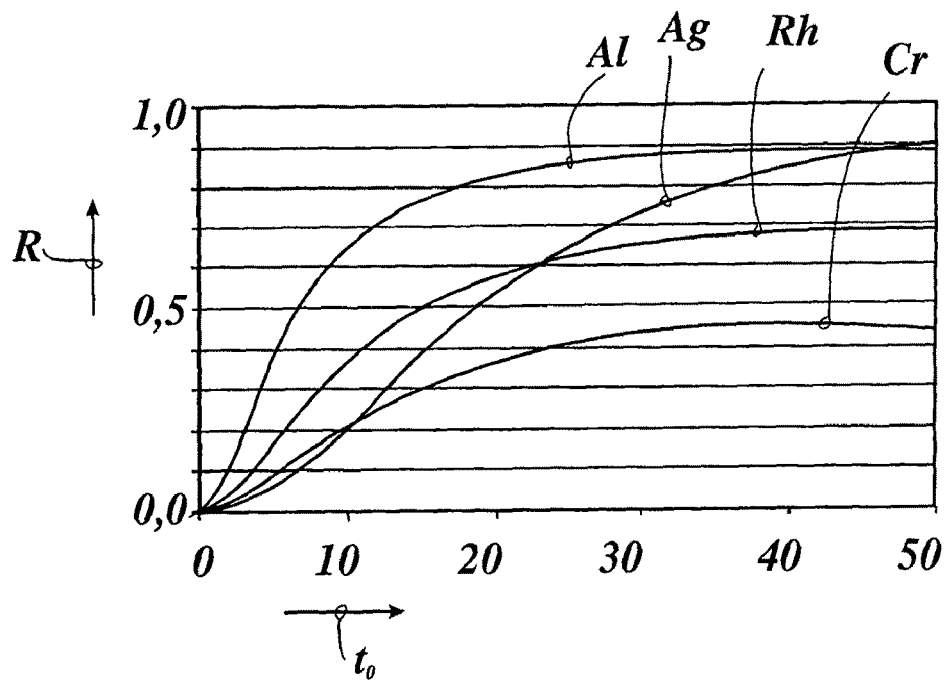
FIGS. 7a and 7b show a graph view of the relationship between the thickness t of a metal layer and the degree of reflection R for various metals.
Figure 7B:
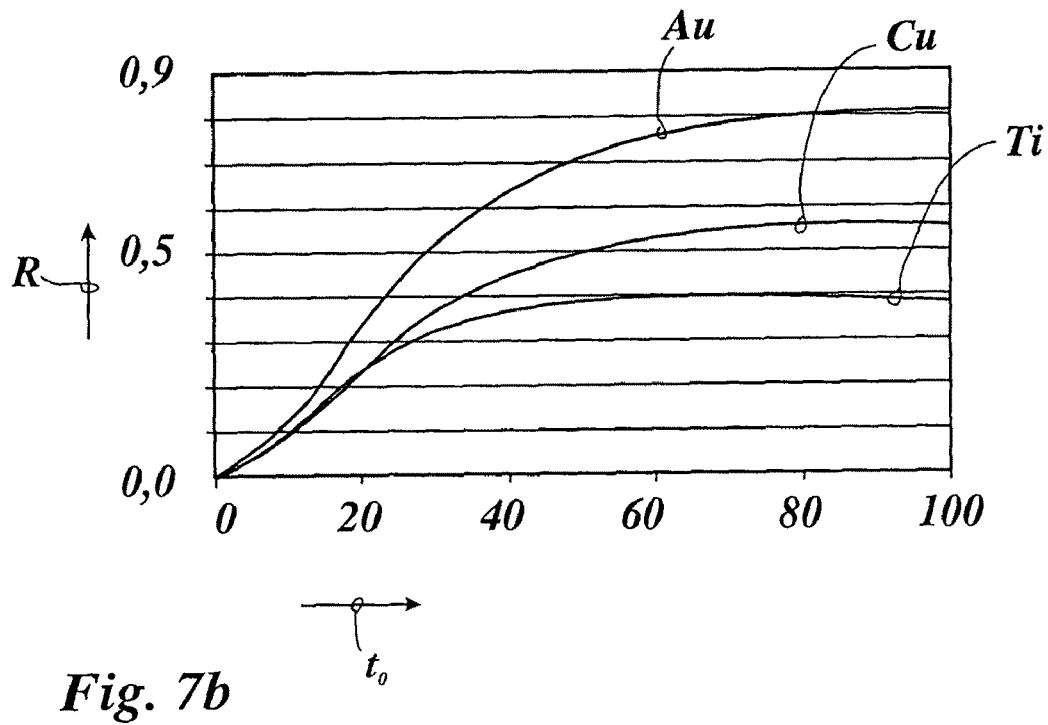

FIGS. 7a and 7b now show the relationships between the thickness t of the metal layer in nm and a degree of reflection R in % for irradiation of the relief structure with light at a wavelength λ=550 nm in dependence on the kind of metal. In that case the metal layer is applied to a transparent substrate which has a refractive index n=1.5. For a metal layer formed from aluminium (Al, see FIG. 7a), it was ascertained by way of example that reflective regions are produced with a thickness t>17 nm and transparent regions are produced with a thickness t<3 nm. The thickness ratio ϵ is consequently to be selected as ϵ=17/3=5.67.

Table 1 shows the ascertained degree of reflection of metal layers of Ag, Al, Au, Cr, Cu, Rh and Ti arranged between plastic films (refractive index n=1.5) at a light wavelength λ=550 nm. In this case the thickness ratio ϵ is formed as the quotient from the thickness t of the metal layer required for the degree of reflection R=80% of the maximum $R_{max}$ and that required for the degree of reflection R=20% of the maximum $R_{max}$.

TABLE 1

| Metal | $R_{max}$ | t for 80% $R_{max}$ | t for 20% $R_{max}$ | ϵ | h/d |
|---|---|---|---|---|---|
| Ag | 0.944 | 31 nm | 9 nm | 3.4 | 1.92 |
| Al | 0.886 | 12 nm | 2.5 nm | 4.8 | 2.82 |
| Au | 0.808 | 40 nm | 12 nm | 3.3 | 1.86 |
| Rh | 0.685 | 18 nm | 4.5 nm | 4.0 | 2.31 |
| Cu | 0.557 | 40 nm | 12 nm | 3.3 | 1.86 |
| Cr | 0.420 | 18 nm | 5 nm | 3.6 | 2.05 |
| Ti | 0.386 | 29 nm | 8.5 nm | 3.3 | 1.86 |

From heuristic consideration silver and gold (Ag and Au), as will be seen, have a high maximum degree of reflection $R_{max}$ and require a relatively low depth-to-width ratio to afford transparency. Aluminium (Al) admittedly also has a high maximum degree of reflection $R_{max}$ but requires a higher depth-to-width ratio. It can preferably therefore be provided that the metal layer is formed from silver or gold. It can however also be provided that the metal layer is formed from other metals or from metal alloys.

FIGS. 8a to 8d now show diagrammatic sectional view of an embodiment illustrating the configuration of relief structures 825a, 825b, 826a and 826b with differing degrees of transparency of the applied metal layer. In the illustrated example those relief structures have structure elements with a spacing d=350 nm between two structure elements. The spacing d is not shown in FIGS. 8a to 8d. The relief structure is occupied in each case by a metal layer 823 formed with the nominal thickness $t_0$=40 nm. With that thickness the metal layer 823 appears opaque or reflective on a flat background.

FIG. 8a diagrammatically shows the transparent relief structure 825a which is of a depth h=800 nm. The depth-to-width ratio which is responsible for the level of the degree of transparency of the metal layer 823 is consequently h/d=2.3.

FIG. 8b diagrammatically shows the transparent relief structure 825b which is of a depth h=400 nm. The depth-to-width ratio which is responsible for the level of the degree of transparency of the metal layer 823 is consequently h/d=1.14. The metal layer 823 appears less transparent than in the embodiment of FIG. 8a.

FIG. 8c diagrammatically shows the opaque relief structure 826a which is of a depth h=100 nm. The depth-to-width ratio responsible for the level of the degree of transparency of the metal layer 823 is consequently h/d=0.29. The degree of transparency of the metal layer 823 is now so slight that the metal layer 823 appears opaque, but nonetheless has a transparent component, in comparison with the embodiment shown in FIG. 8d.

FIG. 8d diagrammatically shows the relief structure 826b which is of a depth h=0 nm. The depth-to-width ratio which is responsible for the level of the degree of transparency is consequently h/d=0. The metal layer 823 appears completely opaque, for example reflective.

Table 2 now shows the calculation results obtained from strict diffraction calculations for relief structures with differing depth-to-width ratios, which are in the form of linear, sinusoidal gratings with a grating spacing of 350 nm. The relief structures are coated with silver, with a nominal thickness $t_0$=40 nm. The light which impinges on the relief structures is of the wavelength λ=550 nm (green) and is TE-polarised or TM-polarised.

TABLE 2

| Depth-to-width ratio | Grating spacing in nm | Depth in nm | Degree of reflection (OR) TE | Degree of transparency (OT) TE | Degree of reflection (OR) TM | Degree of transparency (OT) TM |
|---|---|---|---|---|---|---|
| 0 | 350 | 0 | 84.5% | 9.4% | 84.5% | 9.4% |
| 0.3 | 350 | 100 | 78.4% | 11.1% | 50.0% | 21.0% |
| 0.4 | 350 | 150 | 42.0% | 45.0% | 31.0% | 47.0% |
| 1.1 | 350 | 400 | 2.3% | 82.3% | 1.6% | 62.8% |
| 2.3 | 350 | 800 | 1.2% | 88.0% | 0.2% | 77.0% |

As was found, in particular the degree of transparency, aside from the depth-to-width ratio, is dependent on the polarisation of the incident light. That dependency is shown in Table 2 for the depth-to-width ratio d/h=1.1. It can be provided that that effect is used for secondary security features.

It was further found that the degree of transparency or the degree of reflection of the relief structure according to the invention is wavelength-dependent. FIGS. 9a to 9e now show in graph views calculation results which demonstrate that effect.

Figure 9A:
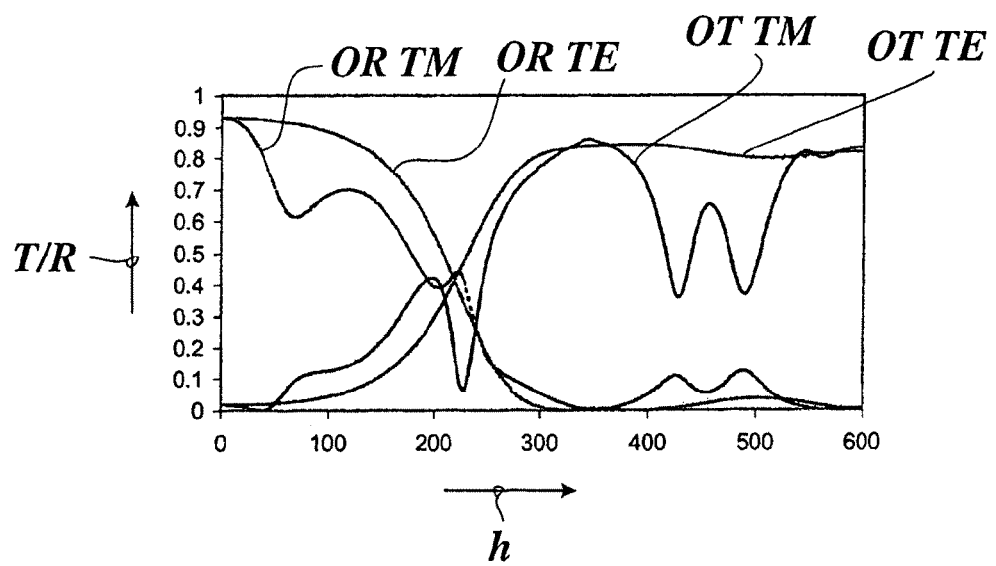
FIG. 9a shows a graph view of the relationship between the degree of transparency T or the degree of reflection R in dependence on depth h for a first metallised linear grating upon lighting with polarised light.

FIG. 9a is a graph view showing the degree of reflection R or the degree of transparency T plotted against the grating depth h in nanometres of a first sinusoidal grating with a grating period or a grating spacing d=300 nm. The grating depth varies from h=0 nm to 600 nm, equivalent to a variation in the depth-to-width ratio h/d=0 to 2. The grating is coated with silver with a layer thickness $t_0$=50 nm and irradiated with polarised light at a wavelength λ=550 nm. The curves are identified by OR TM for the degree of reflection and OT TM for the degree of transparency of TM-polarised light and similarly with OR TE and OT TE for TE-polarised light.

As can be seen from FIG. 9a the effect according to the invention is particularly highly pronounced for TE-polarised light.

Figure 9B:
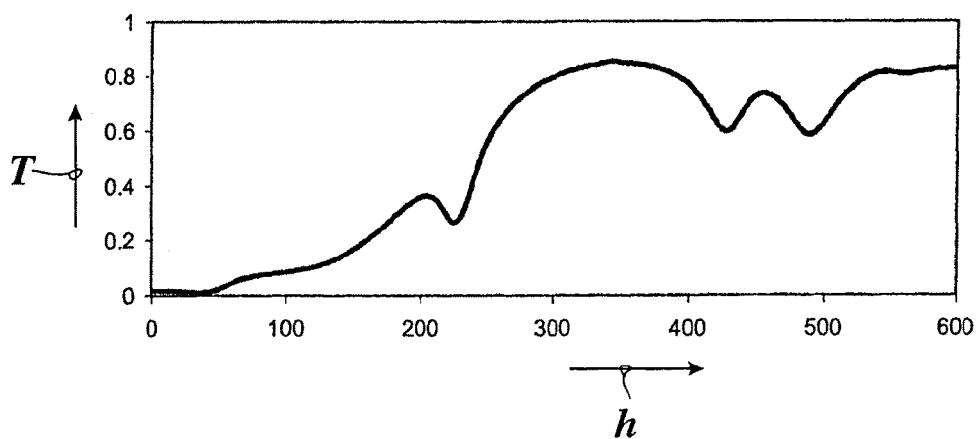
FIG. 9b shows a graph view of the relationship between the degree of transparency T in dependence on the depth h for the linear grating in FIG. 9a upon lighting with non-polarised light.

FIG. 9b now shows the degree of transparency T of the grating used in FIG. 9a with non-polarised light, plotted against the grating depth h.

Figure 9C:
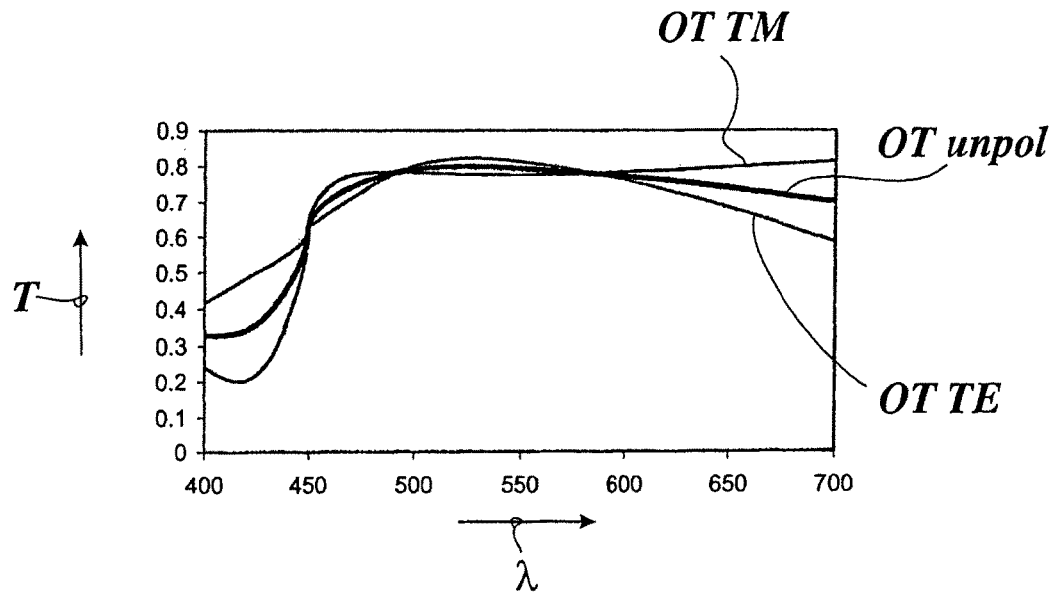
FIG. 9c shows a graph view of the relationship between the degree of transparency T in dependence on the wavelength λ of the light for a second metallised linear grating with a depth-to-width ratio h/d=1.

FIG. 9c shows the influence of the wavelength of the light on the degree of transparency T in the case of a second sinusoidal grating, constructed similarly to FIG. 9a with the grating depth h=300 nm, equivalent to the depth-to-width ratio h/d=1. As can be seen both the polarisation of the light and also the nature of polarisation (OT TM or OT TE) have an influence on the degree of transparency T which at the same time is dependent on the wavelength of the light. The curve identified by OT unpol for unpolarised light extends between the two curves OT TM and OT TE for TM-polarised and TE-polarised light respectively.

Figure 9D:
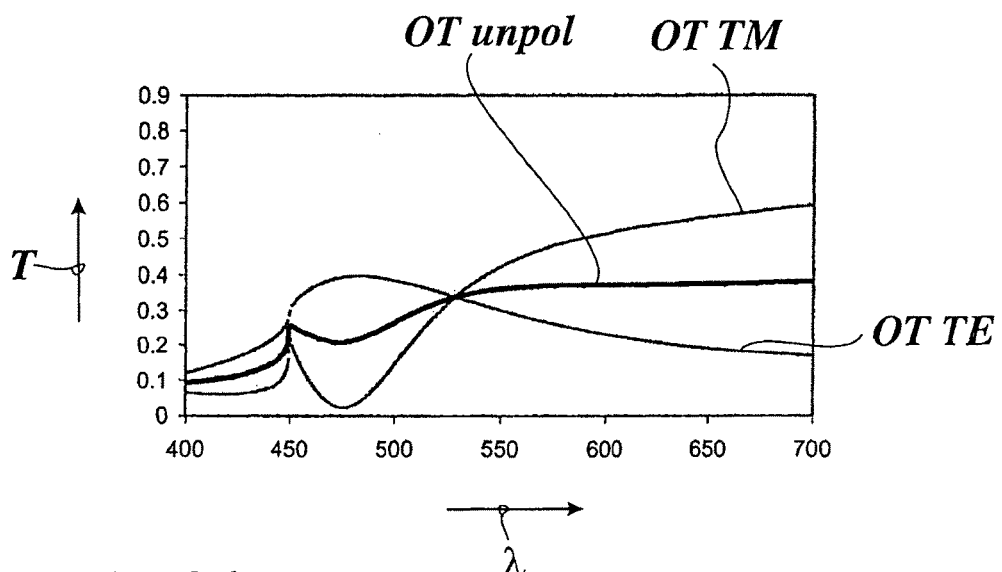
FIG. 9d shows a graph view of the relationship between the degree of transparency T in dependence on the wavelength λ of the light for the metallised linear grating of FIG. 9c with a depth-to-width ratio h/d=0.67.
Figure 9E:
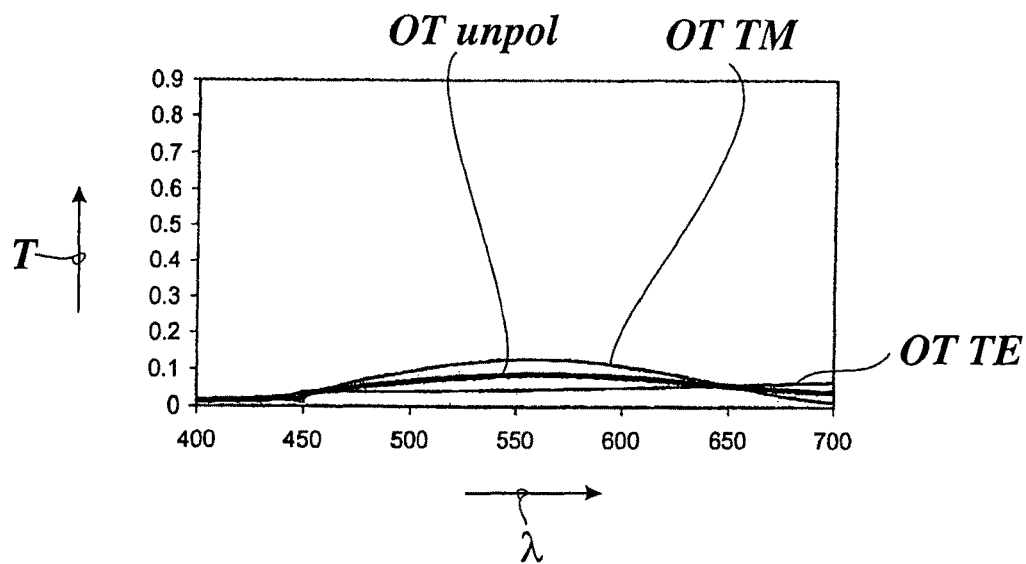
FIG. 9e shows a graph view of the relationship between the degree of transparency T in dependence on the wavelength λ of the light for the metallised linear grating of FIG. 9c with a depth-to-width ratio h/d=0.33.

FIGS. 9d and 9e now show the influence of a decreasing depth-to-width ratio h/d on those curve configurations in respect of the degree of transparency T.

FIG. 9d involves the representation of the degree of transparency T on a sinusoidal grating as shown in FIG. 9c which is constructed with a grating depth h=200 nm, equivalent to a depth-to-width ratio h/d=0.67. The degree of transparency T is markedly lower in relation to FIG. 9c, particularly upon irradiation with unpolarised light. A degree of transparency of close to zero is to be observed for irradiation with TM-polarised light, for λ=450 nm.

FIG. 9e shows the view of the degree of transparency on a sinusoidal grating as shown in FIG. 9c, which is constructed with a grating depth h=100 nm, equivalent to the depth-to-width ratio h/d=0.33. The degree of transparency T is now very slight so that the silver metal layer applied to the grating appears non-transparent at all wavelengths.

As the calculation results illustrated in FIGS. 9a to 9e show relief structures according to the invention with a high depth-to-width ratio can produce colour effects which are to be observed upon irradiation with polychromatic light, for example with daylight. It can be provided that those colour effects are used as an additional secondary security feature.

It was further found that the degree of transparency decreases if the angle of incidence of the light differs from the normal angle of incidence, that is to say the degree of transparency decreases if the light is not perpendicularly incident. That means that a region with a relief structure according to the invention can be transparent only in a limited cone of incidence of the light. It can therefore be provided that that effect is used as a further security feature. It can be provided that the metal layer is opaque, when viewed inclinedly.

Figure 10A:
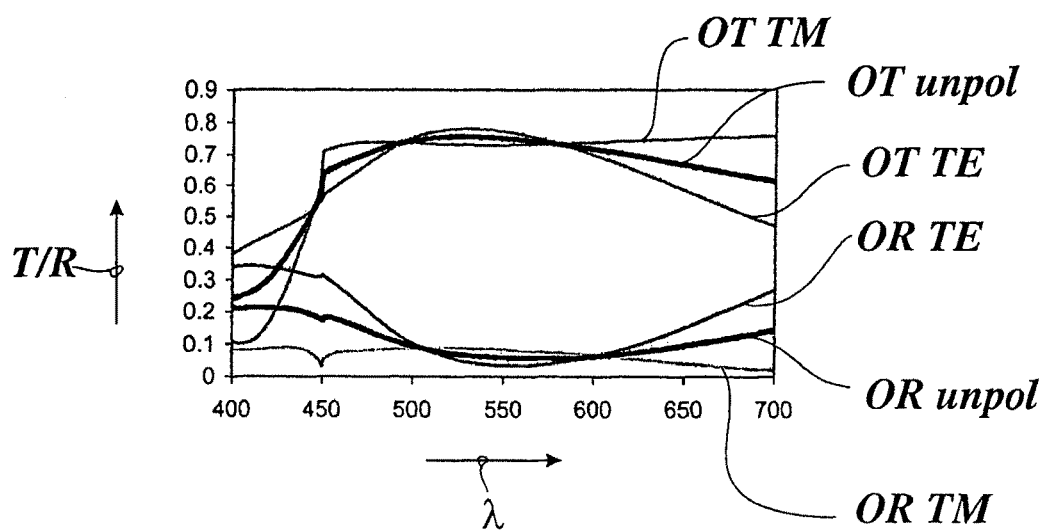
FIGS. 10a to 10c show a graph view of the relationship between the degree of transparency T or the degree of reflection R in dependence on the wavelength λ for a third metallised linear grating upon lighting with different lighting angles.
Figure 10B:
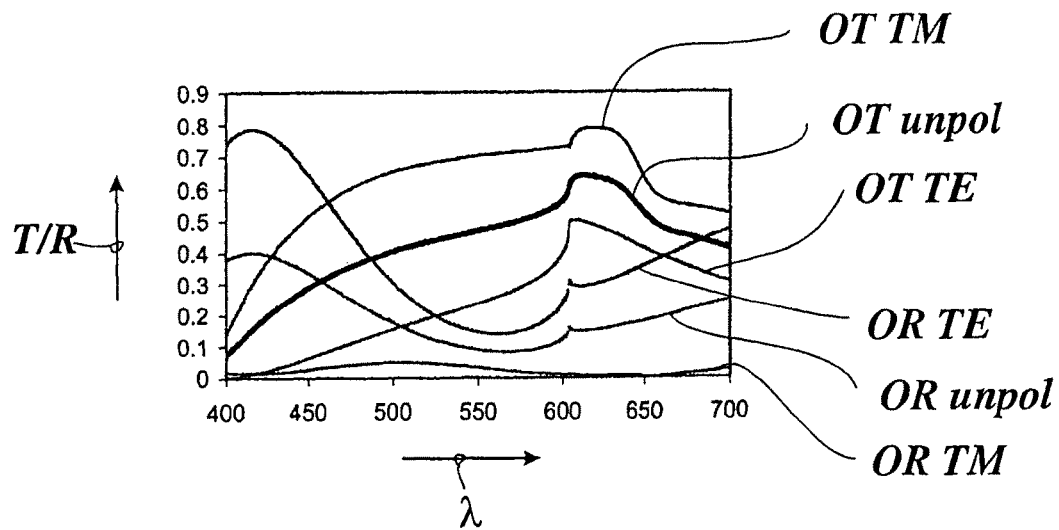
Figure 10C:
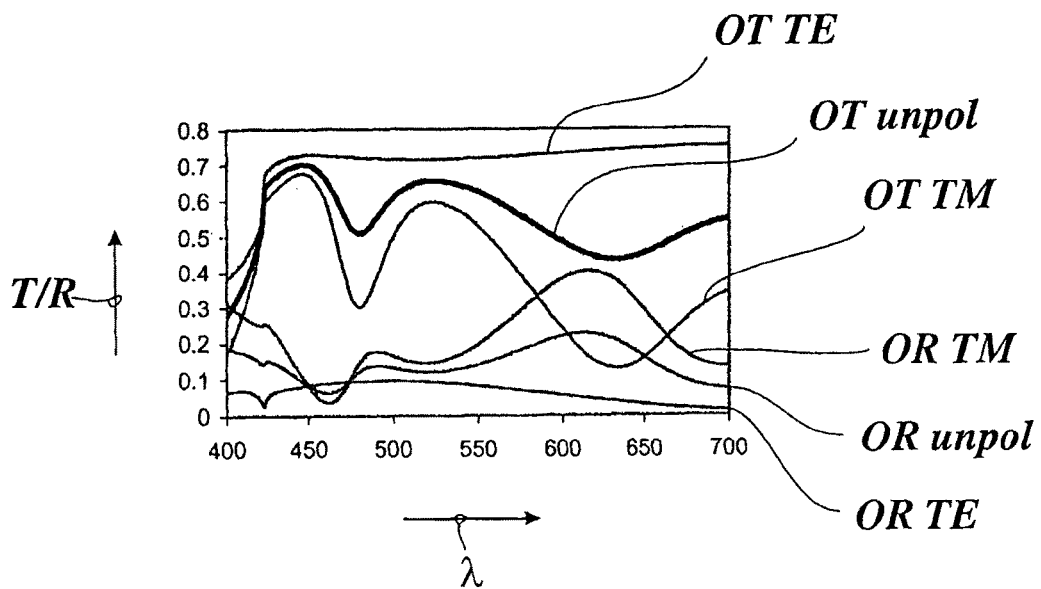

FIGS. 10a to 10c now show the influence of the angle of incidence of the light on the degree of transparency T or the degree of reflection R of a third sinusoidal grating with the grating spacing d=300 nm, coated with silver with a layer thickness $t_0$=55 nm.

FIG. 10a is a graph showing the initial situation when the light is perpendicularly incident. The curve configuration in respect of the degree of transparency T qualitatively corresponds to that shown in FIG. 9c. As will be seen the degree of reflection R is less wavelength-dependent than the degree of transparency T. That applies in particular for illumination of the grating with unpolarised light.

FIG. 10b now shows the curve configuration in respect of the degree of transparency T or the degree of reflection R for illumination at an angle θ=200 with respect to the perpendicular in a direction in perpendicular relationship to the flanks of the grating lines and an angle φ=0° with respect to the perpendicular in a direction parallel to the flanks of the grating lines. The degree of transparency T and the degree of reflection R are now wavelength-dependent in a wide range in comparison with FIG. 10a, in particular also upon illumination with unpolarised light.

FIG. 10c shows the curve configuration in respect of the degree of transparency T and the degree of reflection R for illumination at the angle θ=0° and φ=20°. The light is therefore now incident inclinedly in parallel relationship with the flanks of the grating lines. The wavelength-dependent configurations are markedly qualitatively different in comparison with FIG. 10b.

Figure 11:
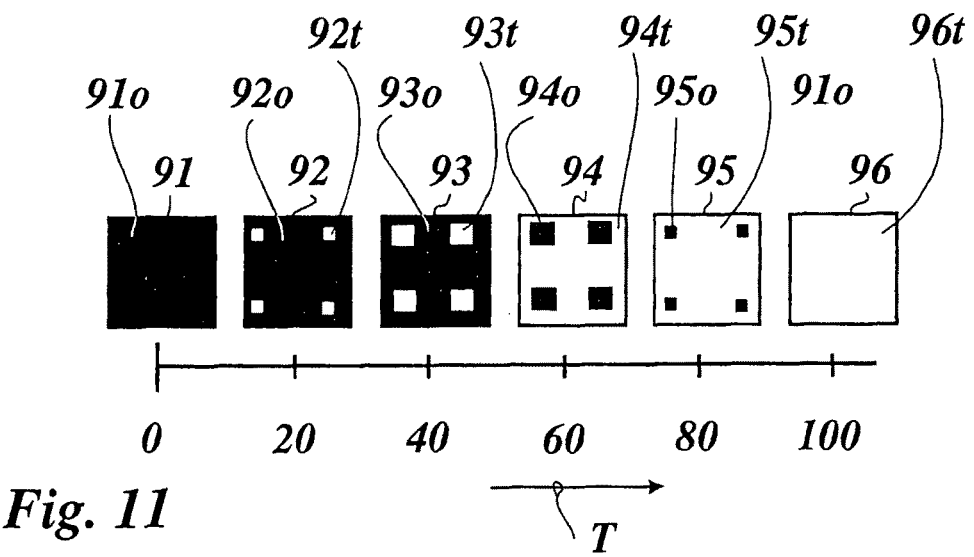
FIG. 11 shows a diagrammatic view of the adjustment of differing transparency by surface rastering.

FIG. 11 now shows a diagrammatic view illustrating an embodiment for the production of regions with a differing degree of transparency T. In this case, regions 91 to 96 are produced with a differing degree of transparency T in steps of 20% beginning at the region 91 which has the degree of transparency T=0%, to the region 96 which has the degree of transparency T=100%. As can be clearly seen from FIG. 11 for that purpose the regions 91 to 96 are of a rastered configuration with opaque raster elements 91o to 95o and transparent raster elements 92t to 96t. The regions 91 to 96 can be in the form for example of pixels with a differing degree of transparency T.

In the illustrated embodiment, the opaque raster elements 91o to 95o are marked in black in FIG. 11 and the transparent raster elements 92t to 96t are marked in white. This is a roughly diagrammatic view which does not reproduce the true size relationships between raster elements and regions. The degree of transparency T of each region 91 to 96 is described by the ratio of the surface area total of the opaque raster elements 91o to 95o to the surface area total of the transparent raster elements 92t to 96t. The raster elements are produced in dimensions which can no longer be resolved by the human eye. Therefore, regions 91 to 96 which are rastered in that way preferably visually appear with equal distribution of the opaque and transparent raster elements as regions with a homogenous degree of transparency T.

In the illustrated embodiment the opaque raster elements 91o to 95o are produced with the depth-to-width ratio h/d=0 and such a nominal thickness $t_0$ in respect of the metal layer that they have the degree of transparency T=0%. The transparent raster elements 92t to 96t are produced with a high depth-to-width ratio, that is to say preferably h/d>2. It can also be provided however that the opaque raster elements 91o to 95o are produced with a low depth-to-width ratio, for example h/d=0.1, and the transparent raster elements 92t to 96t are produced with a depth-to-width ratio which is relatively high in comparison therewith, for example h/d=1.

The regions 91 and 96 contain only raster elements of one type so that for example the region 91, produced only with opaque raster elements 91o, involves the degree of transparency T=0%. The region 96 is produced only with transparent raster elements 92t and therefore involves the degree of transparency T=100%. The regions 92 to 95 are produced both with opaque raster elements 92o to 95o and also with transparent raster elements 92t to 95t and therefore have degrees of transparency of between 20% and 80%.

Figure 12:
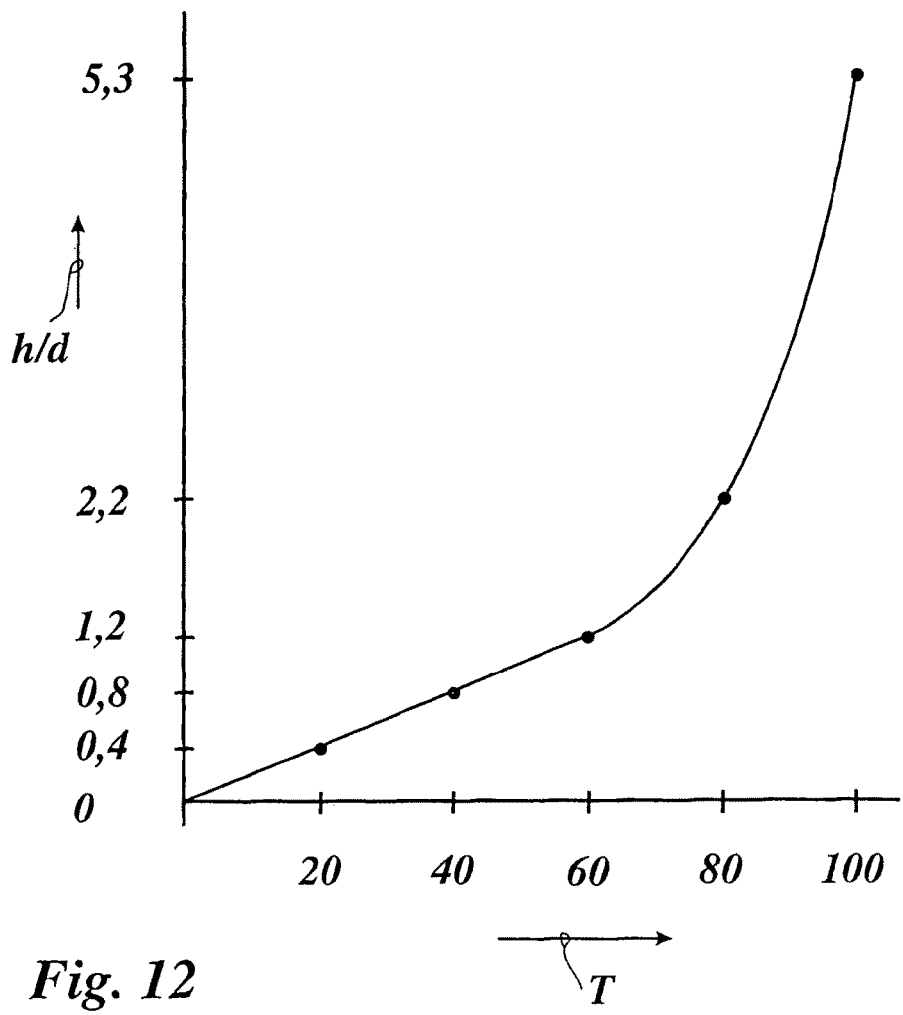
FIG. 12 shows a graph view of the relationship between the degree of transparency T and the depth-to-width ratio of an embodiment of a metal layer.

It can also be provided that regions with differing grey scales are formed, by the depth-to-width ratio being different in the regions. FIG. 12 illustrates by means of a graph with reference to an example how the degree of transparency T can be adjusted by the depth-to-width ratio h/d. As already stated hereinbefore the relationship between the degree of transparency T and the depth-to-width ratio h/d is dependent on a number of parameters, for example the kind of metal and the nature of the relief structure. Basically however the degree of transparency T increases with an increasing depth-to-width ratio h/d. In the present example the degree of transparency T=100% when the depth-to-width ratio h/d=5.3. That ratio is based on the heuristic approach to a solution. Without noticeable decreases in quality the fully transparent region identified by reference 96 in FIG. 11 can already be produced with a depth-to-width ratio h/d=>1.0, for example with h/d=2.2, so that the degree of transparency T=80%. A lower depth-to-width ratio can for example be technologically advantageous.

It can be provided that image representations are generated in that fashion which is described with reference to the FIGS. 11 and 12. Because of the high resolution which is possible with that process, images affording a high imaging quality can be produced in that way, for example in the form of logos or inscriptions. For example line images or black-and-white raster images can be produced with the process of black-and-white rastering. As already described (see FIG. 11), in that respect the degree of transparency of a pixel is determined by the ratio between opaque raster elements and transparent raster elements. It can however also be provided that pixels are in the form of homogenous regions with a differing depth-to-width ratio (see FIG. 12). In that way it can be provided for example that computer images are generated in grey scale mode in the form of image representations. Because of the high resolution which is possible with that process grey scale images of high quality can be produced in that fashion, for example photographic images of high quality can be reproduced against any background.

It is however also possible to produce macroregions with continuously changing transparency and in that way to optically "fade in" elements arranged under such a region. In that way for example it is possible to reproduce a passport photograph without a sharp edge delimitation.

It can also be provided that the solutions characterised in FIGS. 11 and 12 are combined together and thus further effects can be achieved. For example it can be provided that raster elements which are visible to the human eye are used as a configurational element, for example in the form of a journal raster.

Figure 13:
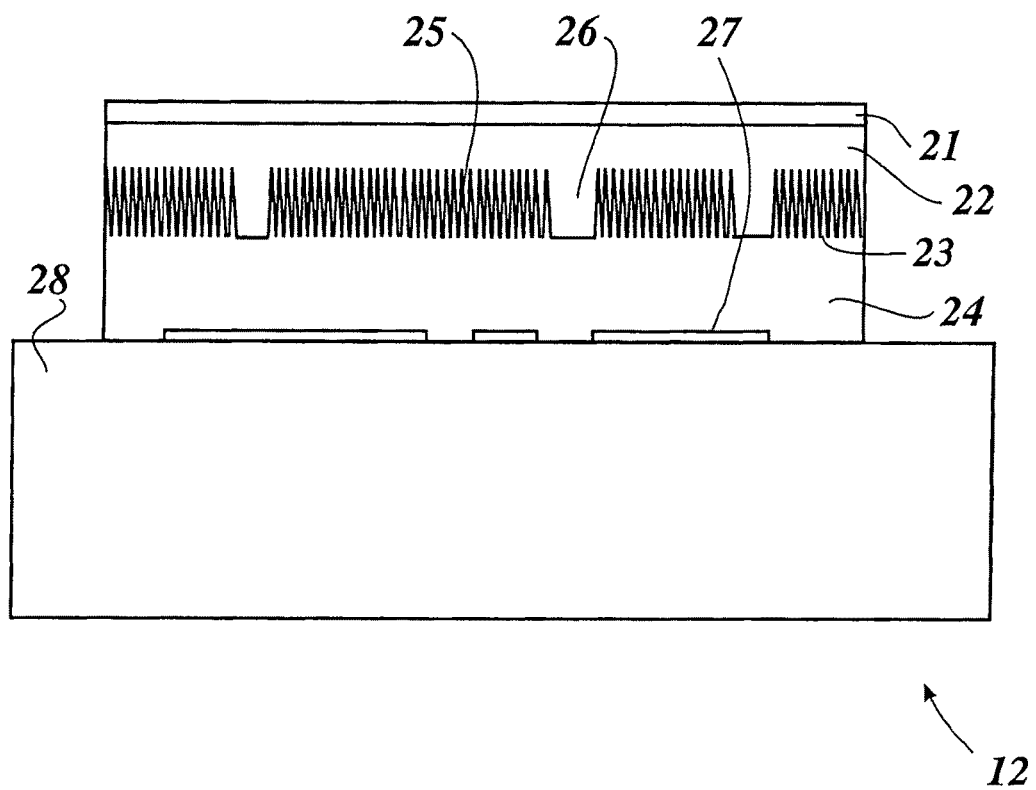
FIG. 13 shows a diagrammatic view of a security document with the security element according to the invention as shown in FIG. 1.

FIG. 13 now shows a diagrammatic view of a security document 12 with a card body 28 and image elements 27 arranged on the card body 28, and the security element 11 shown in FIG. 1. The same elements are denoted by the same references.

For that purpose the security element 11 is pulled off the carrier film 10 and applied to the card body 28. In that respect the release layer 20 (see FIG. 1) assists with release of the security element from the carrier film 10.

Now only the regions of the image elements 27 which are arranged under relief structures 25 are still visible by virtue of the application of the security element 11. The image elements 27 which are arranged under relief structures 26 are not visible for a person viewing the security document. Because of the metal 23 they appear as reflecting regions which, as can be particularly well seen from FIGS. 15 and 16, can be in the form of a fine pattern in the form of a guilloche. A pattern which is applied in accordance with the above-described process can be so fine that it cannot be imitated with another process, for example a colour copying process.

Figure 14:
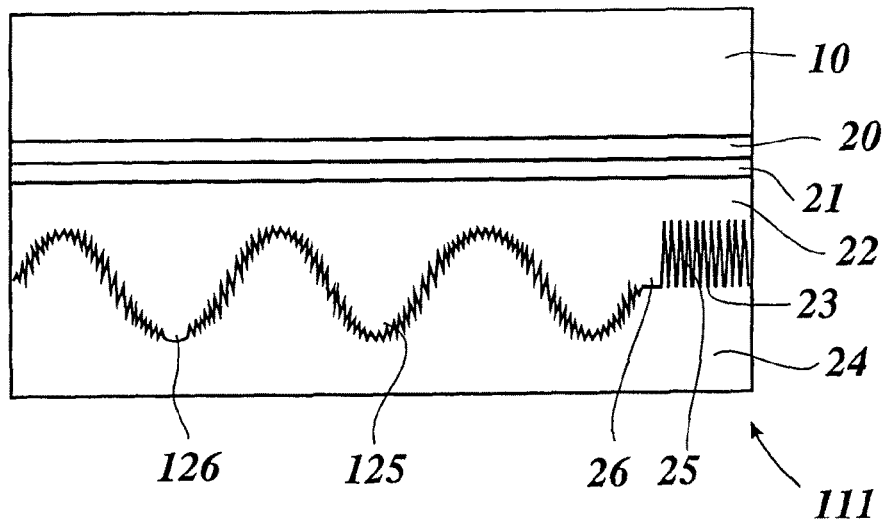
FIG. 14 shows a diagrammatic view of a second embodiment of a security element according to the invention.
Figure 15:
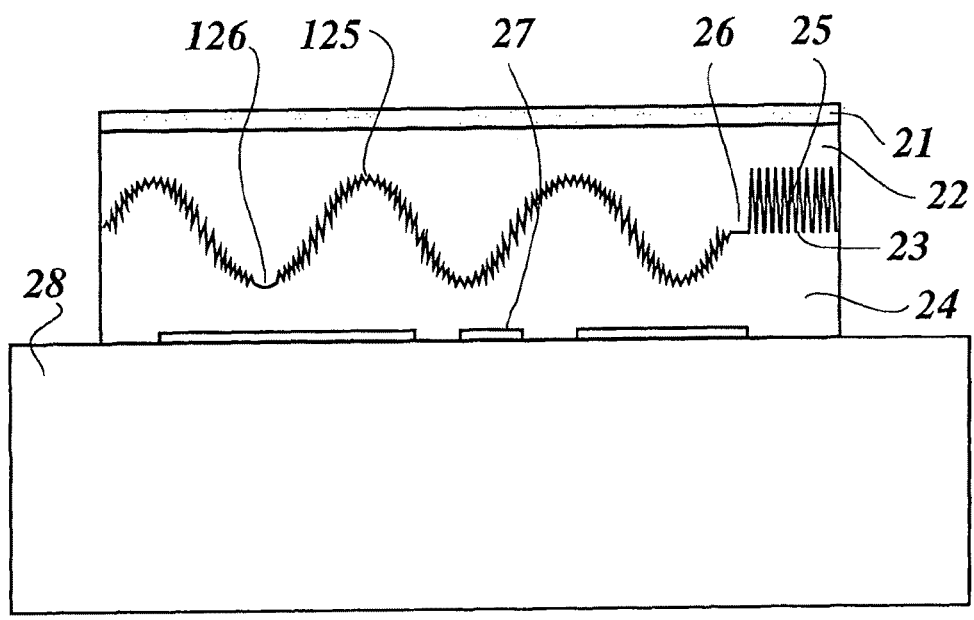
FIG. 15 shows a diagrammatic view of a second embodiment of a security element according to the invention with the security element according to the invention as shown in FIG. 13.

FIGS. 14 and 15 now show a second embodiment of a security element and a security document provided with that security element, wherein the same elements are denoted by the same references.

FIG. 14 shows a security element 111 in the form of a multi-layer film body which has the carrier film 10, the release layer 20, the protective lacquer layer 21, the replication lacquer layer 22, with the relief structures 25, 26 and further relief structures 125, 126, the metal layer 23 and the adhesive layer 24. The relief structures 125 and 126 are in the form of superpositionings of a structure which in the illustrated diagrammatic example is of a sinusoidal configuration, with relief structures 25 and 26 respectively. The superposed structure can involve for example a structure for generating a hologram which in that way appears visible in the regions of the relief structure 125 and invisible in the regions of the relief structure 126. By way of example in that respect the relief structures 26 and 126 can form a guilloche pattern which cannot be reproduced with conventional processes, that is to say it is in the form of a security feature.

By analogy with FIG. 13 FIG. 15 shows a diagrammatic view of a security document 112 to which a security element 111 as shown in FIG. 14 is applied.

Figure 16:
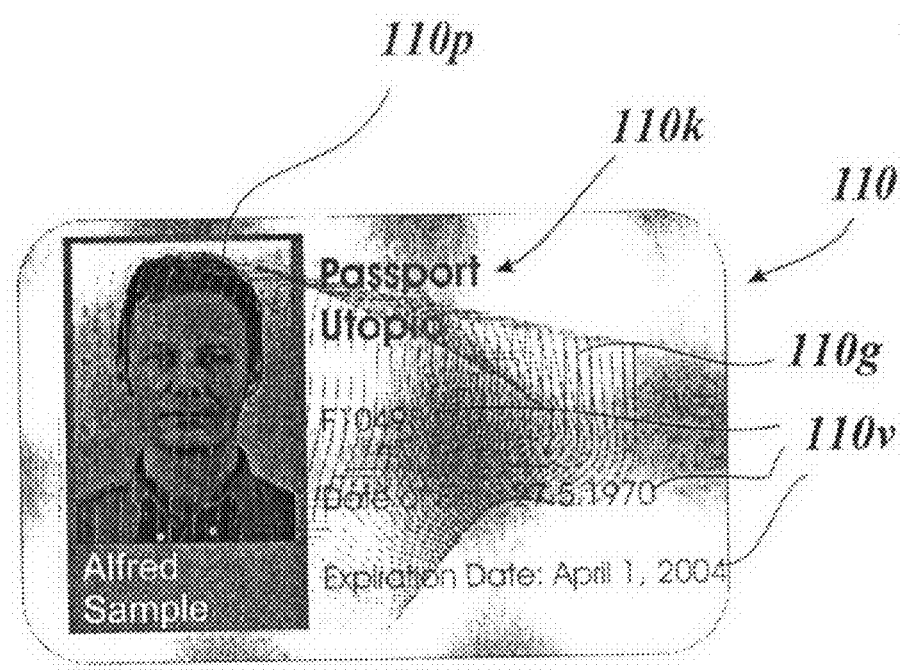
FIG. 16 shows a figurative representation of a plan view onto a security document with a security element according to the invention.
Figure 17:
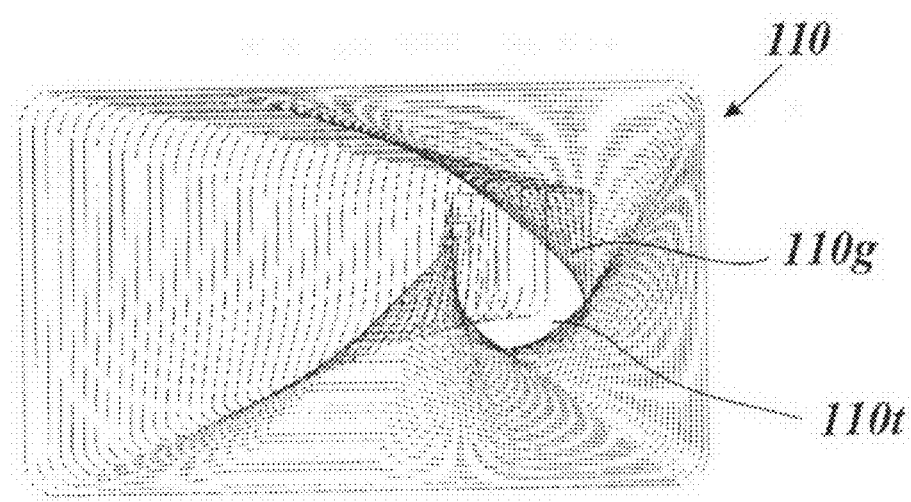
FIG. 17 shows a figurative representation of the guilloche pattern of the security element shown in FIG. 15.

FIGS. 16 and 17 now show an example of use of an identity document 110. That identity document 110 has a photograph 110p of the identity document holder, an inscription 110k, a personalised inscription 110v and a guilloche pattern 110g.

In the illustrated embodiment the photograph 110p, the inscription 110k and the personalised inscription 110v are applied to the card body of the document 110 in accordance with the state of the art. The guilloche pattern 110g which is shown in detail in FIG. 17 for enhanced clarity of illustration is placed over the entire surface of the card. In the illustrated embodiment the lines of the guilloche pattern 110g are in the form of regions with a depth-to-width ratio<0.2 and of a width of 50 µm, which directly adjoin transparent regions with a high depth-to-width ratio. That provides that the identity document is of a forgery-proof nature in a particularly simple fashion for the guilloche pattern 110g cannot be applied with another process.

A security document which is like the embodiment illustrated in FIG. 16 combines the advantage of enhanced level of security against forgery with the advantage of simplified and more precise production. More specifically, because transparent and opaque regions can be produced in one process step, the positioning problems which occur in register printing in accurate register relationship no longer arise, that is to say, transparent regions, opaque regions and background regions no longer have to be positioned with a high level of accuracy relative to each other, as hitherto. The process according to the invention provides that transparent and opaque regions are produced by surface structuring, more specifically precisely where they are intended. In that respect multi-layer thin-film systems, liquid crystal systems and so forth can be included.

The invention claimed is:

1. A security element in the form of a multi-layer film body with a replication lacquer layer, wherein, in a plane defined by co-ordinate axes x and y, a first relief structure is shaped into the replication lacquer layer in a first region of the security element and a metal layer of constant surface density with respect to the plane defined by the co-ordinate axes x and y is applied to the replication lacquer layer in the first region of the security element and in an adjacent second region of the security element, and wherein
   the first relief structure is a diffractive structure with a depth-to-width ratio of the individual structure elements of >0.5 and wherein the metal layer provided on the second region has a nominal layer thickness $t_o$, and wherein the first relief structure has areas with the metal layer having a layer thickness less than the nominal layer thickness $t_o$ such that at least one of the areas with the metal layer having a layer thickness less than the nominal layer thickness $t_o$ forms a transparent area in the first region, wherein the transparency of the metal layer is increased by the first relief structure in the first region with respect to the transparency of the metal layer in the second region.

2. A security element according to claim 1, wherein the metal layer is applied to the replication lacquer layer in a surface density which corresponds to an application of the metal layer on a flat surface with a depth-to-width ratio of equal to zero with a degree of reflection of the metal layer of 85% to 95% of the maximum degree of reflection.

3. A security element according to claim 1, wherein the depth of the relief structure is in the form of a function of the co-ordinates x and/or y.

4. A security element according to claim 3, wherein the function is a stochastic function.

5. A security element according to claim 3, wherein the function is a function of the kind $\sin^2(x, y)$.

6. A security element according to claim 1, wherein a second diffractive relief structure is shaped into the replication lacquer layer in the adjacent second region, wherein the depth-to-width ratio of the individual structure elements of the second relief structure is less than the depth-to-width ratio of the individual structure elements of the first relief structure.

7. A security element according to claim 1, wherein the second relief structure has a depth-to-width ratio of <0.2.

8. A security element according to claim 1, wherein the second relief structure has a depth-to-width ratio of <0.5.

9. A security element according to claim 1, wherein the second region is a pattern region in the form of a guilloche pattern or a logo or a text and the first region is a background region.

10. A security element according to claim 1, wherein the depth-to-width ratio of the first relief structure and/or the second relief structure varies in the x-direction and/or in the y-direction.

11. A security element according to claim 1, wherein the first region or the second region is of a rastered configuration in microregions, wherein the dimensions of the microregions and/or the raster spacing are or is less than the spacing which can be resolved by the human eye.

12. A security element according to claim 1, wherein the second relief structure is a structure which has an optical-diffraction effect generating a pattern, a macrostructure or a matte structure.

13. A security element according to claim 1, wherein the first or second relief structure is formed from a superpositioning of an envelope structure and a diffractive structure with a depth-to-width ratio of the individual structure elements of >0.5.

14. A security element according to claim 13, wherein the envelope structure is a structure having an optical-diffraction effect.

15. A security element according to claim 13, wherein the envelope structure is a macrostructure.

16. A security element according to claim 13, wherein the envelope structure is a matte structure.

17. A security element according to claim 1, wherein the multi-layer film body is a transfer film.

18. A security document, a banknote or passport, having a security element according to claim 1.

19. A process for the production of a security element in the form of a multi-layer film body, wherein, in the process, a first relief structure is shaped into a replication lacquer layer of the multi-layer film body in a first region of the security element and a metal layer of constant surface density with respect to the plane defined by the replication lacquer layer is applied to the replication lacquer layer in the first region of the security element and in an adjacent second region of the security element, and wherein
   the first relief structure is shaped in the form of a diffractive structure with a depth-to-width ratio>0.5 and the metal layer is applied with a surface density with respect to the plane defined by the replication lacquer layer, wherein the metal layer provided on the second region has a nominal layer thickness $t_o$, and wherein the first relief structure has areas with the metal layer having a layer thickness less than the nominal layer thickness $t_o$ in such a way that at least one of the areas with the metal layer having a layer thickness less than the nominal layer thickness $t_o$ forms a transparent area in the first region, wherein the transparency of the metal layer is increased by the first relief structure in the first region with respect to the transparency of the metal layer in the second region.

20. A process according to claim 19, wherein the metal layer is applied to the replication lacquer layer by vapour deposition.

21. A process according to claim 20, wherein a metal for forming the metal layer is deposited on the plane defined by the replication lacquer layer in such a surface density which corresponds to an application of the metal layer on a flat surface arranged perpendicularly to the deposition direction and having a depth-to-width ratio equal to zero with a degree of reflection of the metal layer of 85% to 95% of the maximum degree of reflection of an optically non-transparent metal layer of the metal.

22. A process according to claim 19, wherein, shaped in a third region of the security element is a third relief structure which is in the form of superpositioning of an envelope curve with a fourth relief structure and the first relief structure and/or the second relief structure so that in the sub-regions of the third region, which are superposed with the first relief structure, the information embodied by the fourth relief structure is visible and in the sub-regions of the third region, which are superposed with the second relief structure, the information embodied by the fourth relief structure is not visible.

23. A process according to claim 19, wherein the relief structures are shaped into the replication lacquer layer by means of UV replication.

* * * * *